(12) United States Patent
Wang et al.

(10) Patent No.: US 10,311,244 B2
(45) Date of Patent: Jun. 4, 2019

(54) PREDICTING CHARACTERISTICS OF USERS OF A THIRD PARTY SYSTEM THAT COMMUNICATES WITH AN ONLINE SYSTEM AND DETERMINING ACCURACY OF THE PREDICTED CHARACTERISTICS

(71) Applicant: Facebook, Inc., Menlo Park, CA (US)

(72) Inventors: Weidong Wang, San Jose, CA (US); Erjie Ang, Sunnyvale, CA (US); Yongfeng Liu, East Palo Alto, CA (US); Liang Xu, Bellevue, WA (US); Chaochao Cai, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 267 days.

(21) Appl. No.: 15/282,693

(22) Filed: Sep. 30, 2016

(65) Prior Publication Data
US 2018/0097815 A1 Apr. 5, 2018

(51) Int. Cl.
*G06F 21/31* (2013.01)
*G06F 21/62* (2013.01)
*H04L 29/06* (2006.01)

(52) U.S. Cl.
CPC ........ *G06F 21/6218* (2013.01); *G06F 21/316* (2013.01); *H04L 63/104* (2013.01)

(58) Field of Classification Search
CPC ... G06F 21/6218; G06F 21/316; H04L 63/104
See application file for complete search history.

(56) References Cited

U.S. PATENT DOCUMENTS

| | | | |
|---|---|---|---|
| 7,689,556 B2 * | 3/2010 | Garg | G06Q 30/02 707/765 |
| 2012/0110071 A1 * | 5/2012 | Zhou | G06Q 10/10 709/204 |
| 2012/0166285 A1 | 6/2012 | Shapiro et al. | |
| 2012/0209706 A1 * | 8/2012 | Ramer | G06F 17/30867 705/14.51 |
| 2013/0013682 A1 | 1/2013 | Juan et al. | |
| 2015/0088662 A1 * | 3/2015 | Noller | G06Q 30/02 705/14.66 |
| 2015/0339754 A1 * | 11/2015 | Bloem | G06Q 30/0631 705/26.7 |

* cited by examiner

*Primary Examiner* — Farid Homayounmehr
*Assistant Examiner* — Suman Debnath
(74) *Attorney, Agent, or Firm* — Fenwick & West LLP

(57) ABSTRACT

An online system maintains characteristics for its users and may access characteristics of users maintained by a third party system. The online system may select content for a user of the third party system based on characteristics maintained by the third party system. If the third party system does not maintain a characteristic for its users, the generates a model predicting the characteristic for third party system users based on a set of online system users identified based on characteristics of third party system users. The online system clusters third party system users based on the predicted characteristic for other third party system users connected to the third party system user. Using verified characteristics for third party system users from a trusted third party system, the online system determines an accuracy of the predicted characteristic for third party system users in a cluster.

20 Claims, 3 Drawing Sheets

PREDICTING CHARACTERISTICS OF USERS OF A THIRD PARTY SYSTEM THAT COMMUNICATES WITH AN ONLINE SYSTEM AND DETERMINING ACCURACY OF THE PREDICTED CHARACTERISTICS

BACKGROUND

This disclosure relates generally to presenting content to users of a third party system that communicates with an online system, and more specifically selecting content for a third party system user based at least in part on an accuracy of an age or other characteristic predicted for the third party system by the online system.

An online system allows its users to connect to and to communicate with other users. Users may create profiles on an online system that are tied to their identities and include information about the users, such as interests and demographic information. The users may be individuals or entities such as corporations or charities. Because of the increasing popularity of online systems and the significant amount of user-specific information maintained by online systems, an online system allows users to easily communicate information about themselves to other users and share content with other users.

Further, many online systems communicate with third party systems external to the online system. An online system may provide content to a third party system for presentation to users of the third party system. Additionally, some third party systems may authorize an online system to access information maintained by the third party system for users of the third party system. For example, a third party system authorizes an online system to access at least a subset of information that the third party system includes in a profile for a user of the third party system. The online system may use the information accessed from the third party system to select content for a user of the third party system that the online system provides to the third party system.

Many online systems maintain characteristics associated with their users and select content for presentation to various users based on the characteristics associated with the users. Similarly, various third party systems maintain characteristics associated with users of the third party systems that are used by various third party systems to select content for third party system users. Various characteristics associated with a user may be asserted by the user to an online system or to a third party system. For example, a user asserts an age to the online system, which stores the age in association with the user. However, a third party system communicating with the online system may not maintain characteristics of a user of the third party system that the online system uses to select content. For example, a third party system does not maintain age asserted or a gender asserted by a third party system user with the third party system. However, characteristics that are not maintained by a third party system may be used by an online system that communicates with the third party system to select content, limiting the effectiveness of content items selected by the online system for a user of the third party system. For example, if a third party system does not maintain an age for a user of the third party system, the online system is unable to identify whether content items identifying a particular age range are suitable for presentation to the user of the third party system from the information maintained by the third party system.

SUMMARY

An online system maintains information describing various characteristics of its users as well as connections between users and other users. For example, the online system maintains a user profile associated with a user that includes various characteristics of the user. In many embodiments, the online system maintains an age associated with various users. When selecting content for presentation to a user, the online system accounts for characteristics of the user to increase a likelihood of the user being presented with content likely to be of interest. Accordingly, various content items may be associated with targeting criteria identifying characteristics of users eligible to be presented with the content items, allowing an entity associated with a content item to leverage information associated with users by the online system to specify presentation of the content item to users having particular characteristics. For example, the online system selects candidate content items as content items associated with at least a threshold number of targeting criteria satisfied by characteristics associated with the user by the online system.

Additionally, the online system communicates with one or more third party systems, and selects content for presentation by a third party system to one or more users of the third party systems. To facilitate selection of content for third party system users, a third party system authorizes the online system to access at least a subset of characteristics associated with users of the third party system by the third party system. For example, the third party system maintains a profile for a user of the third party system and authorizes the online system to access at least a subset of the information in the profile maintained by the third party system for the user of the third party system.

However, the third party system may not maintain certain characteristics of users of the third party system. For example, the third party system maintains various characteristics of users of the third party system but does not maintain ages for users of the third party system. As another example, characteristics of users of the third party system maintained by the third party system do not include a gender of users of the third party system. In various embodiments, the third party system does not maintain one or more characteristics of users of the third party system that the online system maintains for users of the online system.

However, various characteristics associated with a user by the online system are specified by the user (also referred to as "asserted characteristics"). For example, the online system maintains an age associated with a user that is specified by the user or determined based on a birthday provided by the user. The online system may use the asserted characteristics to select content items for presentation to users of the online system. For example, the online system identifies a content item as eligible for presentation to a user of the online system if one or more asserted characteristics, or other characteristics, of the user satisfy at least a threshold amount of targeting criteria included in the content item. The online system similarly identifies the content item as eligible for presentation to a user of the third party system if characteristics of the user of the third party system maintained by the third party system and accessible to the online system satisfy at least the threshold amount of targeting criteria included in the content item.

If targeting criteria included in a content item specify one or more characteristics that the third party system does not maintain for users of the third party system, the online system is unable to determine if the content item is eligible for presentation to users of the third party system. For example, if the third party system does not maintain an age for users of the third party system, the online system is unable to determine whether content items including targeting criteria specifying an age range are eligible for presentation to various users of the third party system. To improve content selection for users of the third party system, the online system obtains characteristics of users of the third party system that communicates with the online system and that does not maintain at least one characteristic of users of the third party system. For example, the third party system does not maintain ages for users of the third party system, and the online system obtains characteristics of users of the third party system that the third party system maintains. In various embodiments, the online system obtains characteristics of a set of users of the third party system. For example, the online system samples a set of users of the third party system and obtains characteristics maintained by the third party system for each user in the set. In various embodiments, the online system uses any suitable method to sample the set of users of the third party system. Alternatively, the online system obtains characteristics of each user of the third party system.

Based on the obtained characteristics of users of the third party system, the online system identifies a set of users of the online system so characteristics of users in the set have at least a threshold similarity to the obtained characteristics of users of the third party system. For example, the online system identifies users of the online system for whom the online system maintains characteristics that match at least a threshold amount of obtained characteristics maintained by the third party system for one or more users of the third party system. As another example, the online system determines a distribution of the obtained characteristics and identifies a set of users of the online system so the set of users has a distribution of characteristics that is within a threshold amount of the distribution of the obtained characteristics. Hence, the online system identifies the set of users of the online system so characteristics of users in the set match, or closely approximate, the obtained characteristics of users of the third party system.

Because the online system maintains the characteristic for users in the identified set that the third party system does not maintain for the third party system, the online system generates a model for determining the characteristic that is not maintained by the third party system from characteristics of users in the identified set. Using values of the characteristic maintained by the online system but not maintained by the third party system and values of other characteristics maintained by the online system, the online system train one or more models to determine the characteristic not maintained by the third party system from values of other characteristics. In some embodiments, the online system identifies characteristics that are maintained by the third party system from the characteristics obtained from the third party system and generates one or more model to determine the characteristic not maintained by the third party system based on values maintained by the online system of the characteristic that is not maintained by the third party system and values maintained by the online system for the identified characteristics that are also maintained by the online system. This allows the one or more models to determine the characteristic that is not maintained by the third party system from other characteristics that are maintained by the third party system. For example, if the third party system does not maintain an age for users, the online system generates a model that determines an age for users of the third party system based on asserted ages maintained by the online system for users in the identified set and other characteristics maintained by the online system for users in the identified set.

By applying the generated model to characteristics of users of the third party system that are maintained by the third party system, the online system determines a predicted characteristic of the users of the third party system that is not maintained by the third party system. For example, the online system determines predicted ages of various users of the third party system by applying the generated model to other characteristics of users of the third party system maintained by the third party system. The online system stores a predicted age of a user of the third party system in association with an identifier of the user of the third party system, which may be obtained by the third party system or generated by the online system for the user of the third party system. Hence, the predicted age of a user of the third party system is an age of the user of the third party system that the online system determines from other characteristics of the user of the third party system that are maintained by the third party system. In various embodiments, however, the online system generates one or more models to predict any suitable characteristic that is not maintained by the third party system and determines a predicted characteristic that is not maintained by the third party system by applying the one or more models to other characteristics maintained by the third party system.

While the online system may subsequently use the predicted characteristic that is not maintained by the third party system, such as predicted ages, to select content for users of the third party system, the accuracy of the predicted characteristic that is not maintained by the third party system may vary for different users of the third party system. This variation in accuracy of the predicted characteristic may cause the online system to incorrectly identify certain content items as eligible for presentation to users of the third party system. For example, the online system may fail to identify a content item as eligible for presentation to a user of the third party system because a predicted age of the user of the third party system does not satisfy targeting criteria associated with the content item, while an actual age of the user of the third party system does satisfy the targeting criteria. Similarly, the online system may incorrectly identify a content item as eligible for presentation to the user of the third party system because the predicted age of the user of the third party system satisfies targeting criteria associated with the content item, while the actual age of the user of the third party system does not satisfy the targeting criteria. This reduces the likelihood of the user of the third party system being presented with content items in which the user of the third party system is likely to interact and may prevent certain content items in which the user of the third party system may be interested in being presented to users, which may also decrease the likelihood of the third party system subsequently requesting the online system selecting content for users of the third party system or of entities subsequently providing content items to the online system for presentation to users of the third party system.

To compensate for potential discrepancies between a predicted age of a user of the third party system and the actual age of the user of the third party system, the online system determines an accuracy of the predicted age based at least in part on ages of other users to whom the user is connected via the third party system. The online system identifies other users to whom the user of the third party system is connected via the third party system and identifies predicted ages associated with the other users of the third party system connected to the user of the third party system. In some embodiments, if the third party system maintains unilateral connections between users of the third party system, the online system identifies other users of the third party system who have a unilateral connection to the user of the third party system via the third party system and to whom the user of the third party system has established a unilateral connection via the third party system. Alternatively, the online system identifies other users of the third party system having a bilateral connection to the user of the third party system via the third party system. In other embodiments, the online system identifies other users of the third party system who have established a unilateral connection to the user of the third party system via the third party system or identifies users of the third party system to whom the user of the third party system has established a unilateral connection via the third party system.

For multiple users of the third party system, the online system determines a distribution of predicted ages (or a distribution of another predicted characteristic) associated with other identified users of the third party system connected to the user via the third party system. In various embodiments, the online system maintains multiple age ranges and determines the distribution of predicted ages associated with identified other users of the third party system connected to a user of the third party system by identifying a number of identified other users of the third party system connected to the user of the third party system with whom the online system maintains a predicted age within an age range. The age ranges are non-overlapping in various embodiments so a predicted age associated with an identified other user of the third party system connected to the user of the third party system is within a single age range. For example, the online system maintains non-overlapping age ranges each covering 10 years and associates a distribution with the user of the third party system identifying a number or a percentage of identified users of the third party system connected to the user of the third party system associated with a predicted age that is within each age range. In some embodiments, the online system maintains different age ranges, allowing the online system to determine different distributions of predicted ages associated with identified other users of the third party system connected to the user of the third party system for users of the third party system having different characteristics maintained by the third party system (e.g., users of the third party system associated with a particular location, users of the third party system associated with a particular gender, etc.) or for use when selecting different types of content (e.g., a distribution of ages including more specific age ranges for selecting advertisements and another distribution of ages including broader age ranges for selecting content generated by the online system).

In various embodiments, the online system determines the distribution of predicted ages (or other predicted characteristics) associated with the identified other users of the third party system connected to a user of the third party system by generating a vector for the user, of the third party system where each dimension of the vector specifies a number or a percentage of the identified other users of the online system connected to the user of the third party system having a predicted age within an age range. For example, the online system clusters users of the third party system by applying a clustering algorithm to the vectors associated with each user of the third party system based on the predicted ages of identified other users of the third party system connected to the users of the third party system via the third party system. For example, a clustering algorithm generates clusters of users of the online system based on distances between vectors associated with the various users of the third party system. The online system may generate a specified number of clusters (e.g., a number of clusters specified by information stored by the online system) or generate a number of clusters until centroids of different clusters are separated by less than a threshold distance. Hence, different clusters of users of the third party system include users of the third party system who are connected to other users of the third party system having similar distributions of predicted ages. The distribution of ages of other users of the third party system connected to a user of the third party system provides information relevant to an accuracy of the predicted age of the user of the third party system, as a user of the third party system is likely to have a larger number of connections to identified other users of the third party system having predicted ages similar to a predicted age of the user of the third party system. In other embodiments, the online system determines any other suitable characteristic of the user of the third party system capable of providing information relevant to the accuracy of the predicted age (or other predicted characteristic) of the user of the third party system and clusters the users of the third party system based on the characteristic, allowing the online system to generate clusters of users each including users of the third party system with a similar characteristic that provides information relevant to the accuracy of the predicted age of the user of the third party system (or of another predicted characteristic of the user of the third party system).

For each of the clusters, the online system receives information from a trusted additional third party system describing verified ages of at least a subset of users of the third party system in a cluster. An additional trusted third party system maintains information associated with users having a higher likelihood of being accurate than information associated with users by the third party system. For example, a trusted additional third party system includes information provided by users to multiple sources or includes information provided by a user to one or more particular organizations or entities (e.g., census information provided by users). As another example, a trusted additional third party system obtains information from a panel of users for whom the additional third party system has verified characteristics. Hence, the verified ages received from the trusted additional third party system are more likely to accurately identify actual ages of the users of the third party system.

Based on the verified ages received from the trusted additional third party system and the predicted ages of users of the third party system, the online system determines an accuracy of the predicted ages for the subset of users of the third party system in the cluster. For example, the online system compares predicted ages for the subset of users of the third party system in the cluster to verified ages of the subset of users in the cluster and determines an accuracy of the predicted ages for users in the subset as a percentage of users of the third party system in the subset of the cluster having predicted ages that match verified ages from the trusted additional third party system. The online system stores the determined accuracy in association with the cluster. Accuracies for each cluster are stored in association with the clusters by the online system, allowing the online system to maintain a measure of the accuracies of predicted ages associated with users of the third party system in the cluster. Determining the accuracies for various clusters allows the online system to identify clusters of users having higher or lower accuracies relative to other clusters. This allows the online system to identify an accuracy of a predicted age of a user of the third party system based on the cluster to which the user of the third party system belongs, improving content selection for the user of the third party system by accounting for the likely accuracy of the predicted age of the user of the third party system reflecting an actual age of the user of the third party system.

The online system allows users or other third party systems to use accuracies of predicted ages of users of the third party system as targeting criteria for content items in addition to an age associated with the user, or the online system otherwise uses accuracies of predicted ages of users of the third party system when selecting content for presentation to various users of the third party system. For example, targeting criteria associated with a content item by a user, by another third party system, or by the online system specifies a threshold accuracy of a predicted age of a user of the third party system, so the content item is eligible for presentation to the user of the third party system if the accuracy for the predicted age for the user of the third party system equals or exceeds the threshold accuracy. When the online system identifies an opportunity to present content to a viewing user of the third party system, the online system identifies a cluster including the viewing user of the third party system and determines an accuracy associated with the cluster. Hence, the accuracy of the cluster including the viewing user of the third party system represents an accuracy of the predicted age for the user of the third party system determined by the online system. The online system includes the content item in one or more selection processes for presentation to the viewing user of the third party system in response to determining the accuracy of the cluster including the viewing user of the third party system equals or exceeds a threshold accuracy included in the targeting criteria associated with the content item and determining the predicted age of the viewing user of the third party system satisfies one or more targeting criteria associated with the content item.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
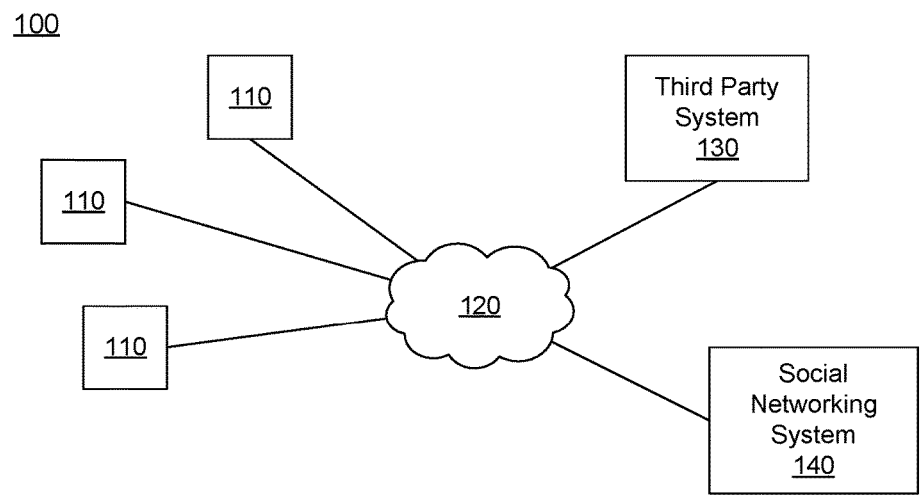
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The online system 140 may be a social networking system, a content sharing network, a content provider, or any other suitable system providing content its users in various embodiments.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130. Additionally, various third party systems 130 maintain characteristics for users of the third party systems 130. For example, a third party system 130 maintains a user profile for a user of the third party system 130 that includes characteristics of the user of the third party system (e.g., demographic information of the user of the third party system 130, connections between the user of the third party system 130 and other users of the third party system 130, actions performed by the user of the third party system 130 and identified to the third party system 130, etc.).

A third party system 130 coupled to the network 120 may be a trusted third party system 130 maintaining information associated with users of the online system 140 or of another third party system 130 having a higher likelihood of being accurate than information associated with users by the online system 140 or by the other third party system 130. For example, a trusted third party system 130 includes information provided by users to multiple sources or includes information provided by a user to one or more particular organizations or entities (e.g., census information provided by users). As another example, a trusted third party system 130 obtains information from a panel of users for whom the trusted third party system 130 has verified characteristics of the users on the panel. Hence, characteristics of users maintained by a trusted third party system 130 are considered "verified characteristics" relative to characteristics of users maintained by the online system 140 or relative to characteristics of users maintained by another third party system 130 because of the relatively higher likelihood of the characteristics maintained by the trusted third party system 130 being accurate.

Figure 2:
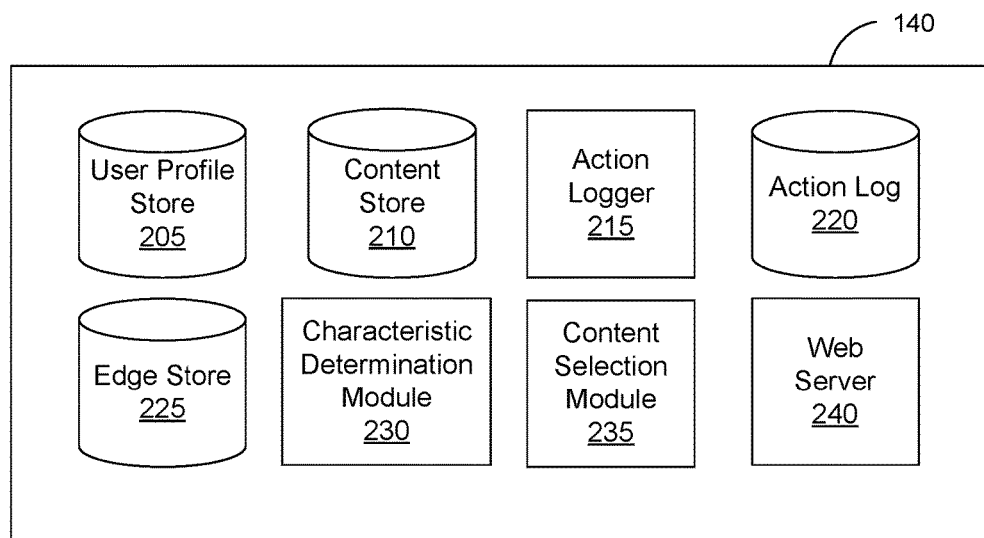
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a characteristic accuracy determination module 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

A user profile for a user of the online system 140 includes various characteristics that are specified or provided to the online system 140 by the user. These characteristics are referred to herein as "asserted characteristics." For example, a user specifies an age to the online system 140, which stores the age in the user profile corresponding to the user. As another example, the user specifies a birthday to the online system 140, which determines an age associated with the user based on the birthday specified by the user. In the preceding examples, the age associated with the user in the user profile is an "asserted age" as it is based on information specified by the user. Various other characteristics may be determined based on information specified to the online system by the user 140. Additionally, characteristics in a user profile inferred by the online system 140 may also be identified as "asserted characteristics." Inferring characteristics for a user profile is further described in conjunction with U.S. patent application Ser. No. 12/916,322, filed on Oct. 29, 2010, which is hereby incorporated by reference in its entirety. While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also includes a landing page specifying a network address to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The characteristic determination module 230 determines one or more predicted characteristics of a user of a third party system 130 that communicates with the online system 140 and determines an accuracy of the one or more predicted characteristics of the user of the third party system 130. The third party system 130 may not maintain a characteristic that the online system 140 uses to select content for presentation to users of the third party system 130, as further described below, so the characteristic determination module 230 predicts the characteristic that the third party system 130 does not maintain from other characteristics maintained by the third party system 130. As further described below, the characteristic determination module 230 obtains characteristics maintained by the third party system 130 for users of the third party system 130 and identifies a set of users of the online system 140 so characteristics of the users of the online system 140 in the identified set have at least a threshold similarity to the obtained characteristics. For example, the characteristic determination module 230 identifies the set of users of the online system 140 so a distribution of characteristics of users in the identified set differs from a distribution of the obtained characteristics of users of the third party system 130 by less than a threshold amount. Based on characteristics of users of the online system 140 in the identified set, the characteristic generates one or more models that predict the characteristic that is not stored by the third party system 130 based on other characteristics that are stored by the third party system 130. For example, if the third party system 130 does not maintain an age for users of the third party system 130, the characteristic determination module 230 generates a model that predicts an age of a user of the third party system 130 based on other characteristics that are maintained by the third party system 130. For example, the characteristic determination module 230 trains a model based on the characteristic maintained by the online system 140 and not maintained by the third party system 130 and other characteristics maintained by the online system 140. The characteristic determination module 230 applies the generated model to characteristics of users of the third party system 130 to determine the characteristic that is not maintained by the third party system 130 for the users of the third party system 130. For example, the characteristic determination module 230 applies a generated model to characteristics of users of the third party system 130 maintained by the third party system 130 to determine a predicted age of the users of the third party system 130, as further described below in conjunction with FIG. 3.

However, an accuracy of a predicted characteristic may vary for different users of the third party system 130, which may affect subsequent selection of content for a user of the third party system 130 by the online system 140. The characteristic determination module may account for accuracy of the predicted characteristic for a user of the third party system 130 because certain predicted characteristics of the user of the third party system 130 may be similar to predicted characteristics associated with other users of the third party system 130 connected to the user of the third party system 130. For example, a user of the third party system 130 may is likely to have connections via the third party system 130 to other users of the third party system 130 with similar predicted ages to the user of the third party system 130, allowing the characteristic determination module 230 to determine an accuracy of the predicted age of the user of the third party system 130 based on ages predicted ages of other users of the third party system 130 connected to the user of the third party system 130 via the third party system 130. As another example, the characteristic determination module 230 may determine an accuracy of a predicted location (e.g., a hometown) of a user of the third party system 130 based on predicted locations for other users of the third party system 130 connected to the user of the third party system 130 via the third party system 130.

As further described below in conjunction with FIG. 3, to determine an accuracy of a predicted characteristic for a user of the third party system 130, the characteristic determination module 230 identifies other users of the third party system 130 connected to the user of the third party system via the third party system 130 and determines a distribution of the characteristic predicted for the other users of the third party system 130 connected to the user of the third party system 130 via the third party system 130. In various embodiments, the characteristic determination module 230 maintains multiple non-overlapping ranges for a predicted characteristic (e.g., multiple age ranges if the predicted characteristic is an age) and determines the distribution of the characteristic predicted for other users of the third party system 130 connected to a user of the third party system 130 by identifying a number of other users of the third party system 130 connected to the user of the third party system 130 via the third party system 130 who have the predicted characteristic within different ranges. As an example, the characteristic determination module 230 associates a distribution with the user of the third party system 130 identifying a number or a percentage of other users of the third party system 130 connected to the user of the third party system 130 via the third party system 130 having the predicted characteristic within each range. The characteristic determination module 230 determines distributions of the characteristic predicted for users of the third party system 130 based on the characteristic predicted for other users of the third party system 130 connected to the users of the third party system 130 via the third party system 130 and clusters the users of the third party system 130 into multiple clusters based on the distributions associated with the users of the third party system 130. In various embodiments, the characteristic determination module 230 determines a vector associated with each user of the third party system 130 based on the distribution of the characteristic predicted for other users of the third party system 130 connected to a user of the third party system 130 via the third party system 130. Each dimension of a vector associated with the user of the third party system 130 specifies a number or a percentage of the other users of the third party system 130 connected to the user of the third party system 130 via the third party system 130 having the predicted characteristic within a range. For example, if the characteristic determination module 230 identifies 5 ranges for the predicted characteristic, the vector associated with a user of the third party system 130 has 5 dimensions each based on a number or a percentage of other users of the third party system 130 connected to the user of the third party system 130 via the third party system 130 having the predicted characteristic within a range corresponding to a dimension. The characteristic determination module 230 applies a clustering algorithm to the vectors associated with each of various users of the third party system 130 to cluster the users of the third party system 130 into multiple clusters. For example, a clustering algorithm generates clusters of users of the third party system 130 based on distances between vectors associated with various users of the third party system 130. The characteristic determination module 230 may generate a specified number of clusters (e.g., a number of clusters specified by information stored by the characteristic accuracy determination module 235) or may generate a number of clusters until centroids of different clusters are separated by less than a threshold distance, where a centroid of a cluster is an average of the vectors associated with users in the cluster. Hence, different clusters of users include users associated with vectors having small distances between them, indicating users of the third party system 130 in a cluster who are connected to other users of the third party system 130 having similar distributions of the predicted characteristic.

For each of the clusters, the characteristic determination module 230 retrieves information from a trusted additional third party system 130 describing verified characteristics of at least a subset of users of the third party system 130 in a cluster. A trusted additional third party system 130 maintains information associated with users having a higher likelihood of being accurate than information associated with users by the online system 140 or by the third party system 130. For example, a trusted additional third party system 130 includes information provided by users to multiple sources or includes information provided by a user to one or more particular organizations or entities (e.g., census information provided by users). As another example, a trusted additional third party system 130 obtains information from a panel of users for whom the trusted additional third party system 130 has verified characteristics. Hence, the verified ages received from the trusted additional third party system 130 are more likely to be accurate characteristics of the users.

By comparing the characteristic predicted for various users of the third party system 130 in the subset of users in a cluster to the verified characteristic associated with the users of the third party system 130 in the subset of users of the third party system 130 received from the trusted additional third party system 130, the characteristic determination module 230 determines an accuracy of the cluster. In some embodiments, for each user of the third party system 130 included in the subset of users of the third party system 130 in the cluster, the online system 140 compares the characteristic predicted for a user of the third party system 130 by the online system 140 to a verified characteristic associated with the user of the third party system 130 by the trusted additional third party system 130. The characteristic determination module 230 determines the accuracy of the characteristic predicted for users of the third party system 130 in the cluster by the online system 140 as a percentage of users of the third party system 130 in the subset of users of the third party system 130 included in the cluster for whom the characteristic predicted by the online system 140 matches the verified characteristic of the users of the third party system 130 from the trusted third additional party system 130. The characteristic determination module 230 stores information identifying the cluster, identifying the users of the third party system 130 included in the cluster, and the determined accuracy in association with the cluster. Accuracies for each cluster are determined and stored along with information identifying each cluster and identifying users of the third party system 130 included in each cluster, allowing the characteristic determination module 230 to maintain a measure of the accuracies of characteristics predicted for users of the third party system 130 in various clusters, as further described below in conjunction with FIG. 3.

The content selection module 235 selects one or more content items for communication to a client device 110 to be presented to a user. Content items eligible for presentation to the user are retrieved from the content store 210 or from another source by the content selection module 235, which selects one or more of the content items for presentation to the viewing user. A content item eligible for presentation to the user is a content item associated with at least a threshold number of targeting criteria satisfied by characteristics of the user or is a content item that is not associated with targeting criteria. The content selection module 235 may account for an accuracy of a characteristic predicted for a user of a third party system 130 by the online system 140 when determining whether a content item is eligible for presentation to the user of the third party system 130. For example, to determine whether a characteristic predicted for the user of the third party system 130 satisfies targeting criteria associated with a content item, the content selection module 235 retrieves an accuracy of the characteristic predicted for the user of the third party system 130 from the characteristic determination module 230. If the predicted characteristic satisfies the targeting criteria and the accuracy of the predicted characteristic equals or exceeds a threshold value, the content selection module 235 determines the predicted characteristic satisfies the targeting criteria and identifies the content item as eligible for presentation to the user of the third party system 130. However, if the accuracy of the predicted characteristic is less than the threshold value and the predicted characteristic satisfies the targeting criteria, the content selection module 235 determines the content item is ineligible for presentation to the user of the third party system 130, as further described below in conjunction with FIG. 3. The content selection module 235 may maintain the threshold value for the accuracy of the predicted characteristic or the targeting criteria associated with the content item may specify the threshold value for the accuracy of the predicted characteristic. In various embodiments, the content selection module 235 includes content items eligible for presentation to the user in one or more selection processes, which identify a set of content items for presentation to the user. For example, the content selection module 235 determines measures of relevance of various content items to the user based on characteristics associated with the user by the online system 140 and based on the user's affinity for different content items. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items eligible for presentation to the user may be associated with bid amounts. The content selection module 235 uses the bid amounts associated with the content items when selecting content for presentation to the user. In various embodiments, the content selection module 235 determines an expected value associated with various content items associated with bid amounts based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 235 may rank content items based on their associated bid amounts or expected values and select content items having at least a threshold position in the ranking for presentation to the user. In some embodiments, the content selection module 235 ranks both content items not associated with bid amounts and content items associated with bid amounts in a unified ranking based on bid amounts associated with certain content items and measures of relevance associated with the content items. Based on the unified ranking, the content selection module 235 selects content for presentation to the user. Selecting content items through a unified ranking is further described in U.S. patent application Ser. No. 13/545, 266, filed on Jul. 10, 2012, which is hereby incorporated by reference in its entirety.

For example, the content selection module 235 receives a request to present a feed of content to a user of the online system 140. The feed may include one or more content items for which the online system 140 receives compensation for presenting as well as content items, such as stories describing actions associated with other online system users connected to the user. The content selection module 235 accesses one or more of the user profile store 205, the content store 210, the action log 220, and the edge store 225 to retrieve information about the user. For example, information describing actions associated with other users connected to the user or other data associated with users connected to the user are retrieved. The retrieved content items are analyzed by the content selection module 235 to identify candidate content items, including ad requests, eligible for presentation to the user. For example, content items associated with users who not connected to the user or stories associated with users for whom the user has less than a threshold affinity are discarded as candidate content items. Based on various criteria, the content selection module 235 selects one or more of the candidate content items for presentation to the identified user. The selected content items are included in a feed of content that is presented to the user. For example, the feed of content includes at least a threshold number of content items describing actions associated with users connected to the user via the online system 140. Similarly, a third party system 130 may request the content selection module 235 select content for presentation to a user of the third party system 130, and the content selection module 235 obtains characteristics of the user maintained by the third party system 130 and selects content items based on the characteristics of the user maintained by the third party system 130 as described above.

In various embodiments, the content selection module 235 presents content to a user through a newsfeed including a plurality of content items selected for presentation to the user. One or more advertisements may also be included in the feed. The content selection module 235 may also determine the order in which selected content items are presented via the feed. For example, the content selection module 235 orders content items in the feed based on likelihoods of the user interacting with various content items.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Figure 3:
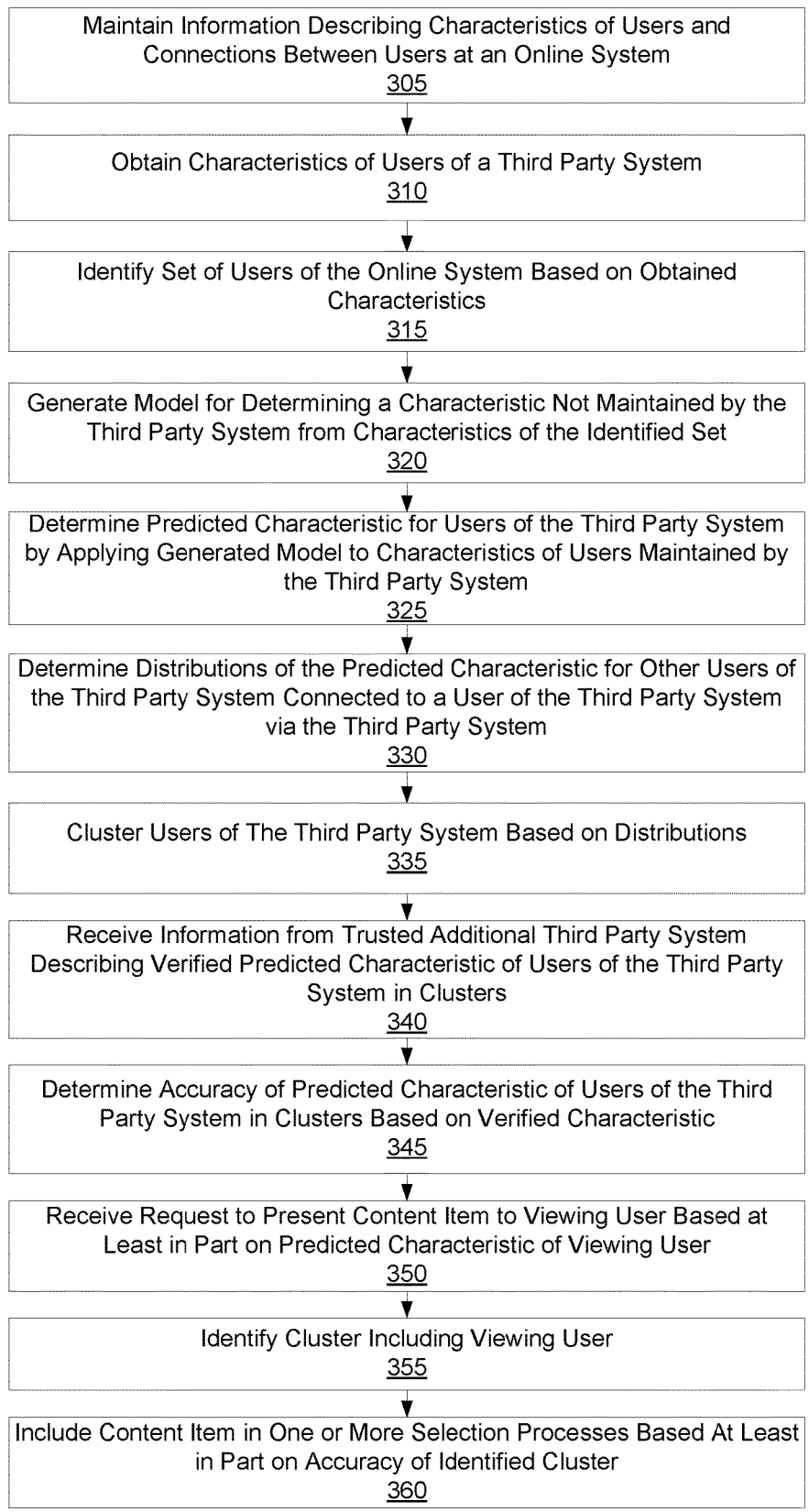
FIG. 3 is a flowchart of a method for determining an accuracy of a characteristic predicted by an online system for a user of a third party system, in accordance with an embodiment.

Predicting Characteristics of a User of a Third Party System and Determining Accuracy of the Predicted Characteristics FIG. 3 is a flowchart of one embodiment of a method for determining an accuracy of a characteristic predicted by an online system 140 for a user of a third party system 130 communicating with the online system 140. In various embodiments, the method includes different and/or additional steps than those described in conjunction with FIG. 3. Additionally, steps of the method may be performed in different orders than the order described in conjunction with FIG. 3 in some embodiments.

The online system 140 maintains 305 information describing various characteristics of its users as well as connections between users and other users. As described above in conjunction with FIG. 2, the online system 140 maintains 305 a user profile associated with a user that includes various characteristics of the user, such as demographic information, interests, or other information declared to the online system 140 by the user. The user profile associated with the user includes an age associated with the user. In various embodiments, the user profile includes an age asserted to the online system 140 by the user (also referred to as an "asserted age"), as well as other characteristics asserted to the online system 140 by the user (also referred to as "asserted characteristics").

Additionally, the online system 140 communicates with one or more third party systems 130 and selects content for presentation by a third party system 130 to one or more users of the third party system 130. To facilitate selection of content for users of the third party system 130 by the online system 140, the third party system 130 authorizes the online system 140 to access at least a subset of characteristics associated with users of the third party system 130 by the third party system 130. For example, the third party system 130 maintains a profile for a user of the third party system 130 and authorizes the online system 140 to access at least a subset of the information in the profile maintained by the third party system 130 for the user of the third party system 130.

However, the third party system 130 may not maintain certain characteristics of users of the third party system 130. For example, the third party system 130 maintains various characteristics of users of the third party system 130 but does not maintain ages for users of the third party system 130. As another example, characteristics of users of the third party system 130 maintained by the third party system 130 do not include a gender of users of the third party system 130. In various embodiments, the third party system 130 does not maintain one or more characteristics of users of the third party system 130 that the online system maintains for users of the online system 140 (e.g., a location).

Various characteristics associated with a user by the online system 140 are specified by the user (also referred to as "asserted characteristics"). For example, the online system 140 maintains 305 an age associated with a user that is specified by the user or determined based on a birthday provided by the user. The online system 140 may use the asserted characteristics to select content items for presentation to users of the online system 140. For example, the online system 140 identifies a content item as eligible for presentation to a user of the online system 140 if one or more asserted characteristics, or other characteristics, of the user satisfy at least a threshold amount of targeting criteria included in the content item. The online system 140 similarly identifies the content item as eligible for presentation to a user of the third party system 130 if characteristics of the user of the third party system 130 maintained by the third party system 130 and accessible to the online system 140 satisfy at least the threshold amount of targeting criteria included in the content item.

If targeting criteria included in a content item specify one or more characteristics that a third party system 130 does not maintain for users of the third party system 130, the online system 140 is unable to determine if the content item is eligible for presentation to users of the third party system 130. For example, if the third party system 130 does not maintain an age for users of the third party system 130, the online system 140 is unable to determine whether content items including targeting criteria specifying an age range are eligible for presentation to various users of the third party system 130. To improve selection of content for users of the third party system 130, the online system 140 obtains 310 characteristics of users of the third party system 130 that communicates with the online system and that does not maintain at least one characteristic of users of the third party system 130. For example, the third party system 130 does not maintain ages for users of the third party system 130, and the online system 140 obtains 310 other characteristics of users of the third party system 130 that the third party system 130 maintains.

In various embodiments, the online system 140 obtains 310 characteristics of a set of users of the third party system 130. For example, the online system 140 samples a set of users of the third party system 130 and obtains 310 characteristics maintained by the third party system 130 for each user in the set. In various embodiments, the online system 140 uses any suitable method to sample the set of users of the third party system 130. Alternatively, the online system 140 obtains 310 characteristics of each user of the third party system.

Based on the obtained characteristics of users of the third party system, the online system 140 identifies 315 a set of users of the online system 140 so characteristics of users in the set have at least a threshold similarity to the obtained characteristics of users of the third party system 130. For example, the online system 140 identifies 315 as set of users of the online system 140 for whom the online system 140 maintains characteristics that match at least a threshold amount (e.g., at least a threshold percentage, at least a threshold number) of obtained characteristics maintained by the third party system 130 for users of the third party system 130. As another example, the online system 140 determines a distribution of the obtained characteristics and identifies 315 a set of users of the online system so the set of users has a distribution of characteristics that is within a threshold amount of the distribution of the obtained characteristics. Hence, the online system 140 identifies 315 the set of users of the online system 140 so characteristics of users in the set match, or closely approximate, the obtained characteristics of users of the third party system 130. This allows the online system 140 to use the identified set as a representation of the users of the third party system 130.

Because the online system 140 maintains 305 the characteristic for users in the identified set that the third party system 130 does not maintain for the users of the third party system 130, the online system generates 320 a model for determining the characteristic that is not maintained by the third party system 130 from the characteristic maintained by the online system 140 for users in the identified set and other characteristics of users in the set. Using values of the characteristic maintained by the online system 140 but not maintained by the third party system 130 and values of other characteristics maintained by the online system 140, the online system 140 trains one or more models to determine the characteristic not maintained by the third party system 130 from values of other characteristics maintained by the online system 140. In some embodiments, the online system 140 identifies characteristics that are maintained by the third party system 130 from the characteristics obtained 310 from the third party system 130 and generates one or more models to determine the characteristic not maintained by the third party system 130 based on values maintained by the online system 140 of the characteristic that is not maintained by the third party system 130 and values maintained by the online system 140 for the identified characteristics that are also maintained by the online system 140. In various embodiments, the online system 140 trains one or more machine learned models based on values of characteristics maintained 305 by the online system 140 for users in the identified set and corresponding values of the characteristic that is not maintained by the third party system 130 but is maintained 305 by the online system 140 for users in the identified set. This allows the one or more models to determine the characteristic that is not maintained by the third party system 130 from other characteristics that are maintained by the third party system 130. For example, if the third party system 130 does not maintain an age for users of the third party system 130, the online system 140 generates 320 a model that determines a predicted age for users of the third party system 130 based on asserted ages maintained by the online system 140 for users in the identified set and other characteristics maintained 305 by the online system 140 that are also maintained by the third party system 130 for users in the identified set.

By applying the generated model to characteristics of users of the third party system 130 that are maintained by the third party system 130, the online system 140 determines 325 a predicted characteristic of the users of the third party system 130 that is not maintained by the third party system 130. For example, the online system 140 determines 325 predicted ages of various users of the third party system 130 by applying the generated model to other characteristics of users of the third party system 130 maintained by the third party system 130. The online system 140 stores a predicted age of a user of the third party system 130 in association with an identifier of the user of the third party system 130, which may be obtained by the third party system 130 or generated by the online system 140 for the user of the third party system 130. Hence, the predicted age of a user of the third party system 130 is an age of the user of the third party system 130 that the online system 140 determines 325 from other characteristics of the user of the third party system 130 that are maintained by the third party system 130 and from the generated model. In various embodiments, however, the online system 140 generates 320 one or more models to predict any suitable characteristic that is not maintained by the third party system 130 and determines 325 a predicted characteristic that is not maintained by the third party system 130 by applying the one or more models to other characteristics maintained by the third party system 130.

While the online system 140 may subsequently use the predicted characteristic that is not maintained by the third party system 130, such as predicted ages, to select content for users of the third party system 130, the accuracy of the predicted characteristic that is not maintained by the third party system 130 may vary for different users of the third party system 130. This variation in accuracy of the predicted characteristic may cause the online system 140 to incorrectly identify certain content items as eligible for presentation to users of the third party system 130. For example, the online system 140 may fail to identify a content item as eligible for presentation to a user of the third party system 130 because a predicted age of the user of the third party system 130 does not satisfy targeting criteria associated with the content item, while an actual age of the user of the third party system 130 does satisfy the targeting criteria To compensate for potential discrepancies between a characteristic predicted for a user of the third party system 130 (e.g., a predicted age of the user of the third party system 130) and the actual age of the user of the third party system 130, the online system 140 determines an accuracy of the predicted characteristic for the user of the third party system based at least in part the characteristic predicted by the online system 140 for other users of the third party system 130 connected to the user of the third party system 130 via the third party system 130. As an example, the online system 140 determines an accuracy of an age predicted for a user of the third party system 130 based on ages predicted by the online system 140 for other users of the third party system 130 who are connected to the user of the third party system 130 via the third party system 130. For at least a group of users of the third party system 130, the online system 140 determines 330 a distribution of the characteristic (e.g., the age) predicted for other users of the third party system 130 connected to a user of the third party system 130 via the third party system 130. In various embodiments, the online system 140 maintains multiple ranges of a predicted characteristic (e.g., multiple age ranges) and determines 330 the distribution of the predicted characteristic (e.g., predicted age) associated with other users of the third party system 130 connected to a user of the third party system 130 via the third party system 130 by identifying a number of other users of the third party system 130 connected to the user of the third party system 130 for whom the online system 140 predicted the characteristic within a range of the predicted characteristic (e.g., predicted an age within an age range). The ranges of the predicted characteristic (e.g., age) are non-overlapping in various embodiments so the characteristic (e.g., the age) predicted for another user of the third party system 130 connected to the user via the third party system 130 is within a single range of the predicted characteristic (e.g., within a single age range). For example, the online system 140 maintains non-overlapping age ranges each covering 10 years and associates a distribution with the user of the third party system 130 identifying a number or a percentage of other users of the third party system 130 connected to the user of the third party system 130 associated with a predicted age that is within each age range. In some embodiments, the online system 140 maintains different age ranges, allowing the online system 140 to determine 330 different distributions of predicted ages associated with other users of the third party system 130 connected to the user of the third party system 130 for users of the third party system 130 having different characteristics (e.g., users associated with a particular location, users associated with a particular gender, etc.) or for use when selecting different types of content (e.g., a distribution of ages including more specific age ranges for selecting content received from another third party system and another distribution of ages including broader age ranges for selecting content generated by the online system 140).

In some embodiments, if the third party system 130 maintains unilateral connections between users of the third party system 130, the online system 140 identifies other users of the third party system 130 who have a unilateral connection to the user of the third party system 130 via the third party system 130 and to whom the user of the third party system 130 has established a unilateral connection via the third party system 130. A unilateral connection between a user and an additional user means that the user is connected to the additional user, but the additional user is not also connected to the user without establishing a separate connection to the user. The online system 140 determines 330 a distribution of the characteristic (e.g., the age) predicted for the identified other users of the third party system 130 as further described above. Alternatively, the online system 140 identifies other users of the third party system 130 having a bilateral connection to the user of the third party system 130 via the third party system 130 and determines 330 the distribution of the characteristic (e.g., the age) predicted for the identified other users of the third party system 130. A bilateral connection between a user and an additional user means that the user and the additional user. In other embodiments, the online system 140 identifies other users of the third party system 130 who have established a unilateral connection to the user of the third party system 130 via the third party system 130 or identifies users of the third party system 130 to whom the user of the third party system 130 has established a unilateral connection via the third party system 130. The online system 140 determines 330 the distribution of the characteristic (e.g., the age) predicted for the identified other users of the third party system 130 connected to a user of the third party system 130 via the third party system 130

Based on the distributions of the predicted characteristic (e.g., predicted ages) associated with other users of the third party system 130 connected to various users of the third party system 130, the online system 140 clusters 335 users of the third party system 130 into various clusters. In various embodiments, the online system 140 determines a vector associated with each user of the third party system 130 based on the distribution of ages associated with other users of the third party system 130 connected to a user of the third party system 130 via the third party system 130. Each dimension of a vector associated with the user of the third party system 130 specifies a number or a percentage of the other users of the third party system 130 connected to the user of the third party system within a range of the predicted characteristic (e.g., within an age range). For example, if the online system 140 identifies 10 age ranges, the vector associated with the user of the third party system 130 has 10 dimensions each based on a number or a percentage of other users of the third party system 130 connected to the user of the third party system 130 within an age range corresponding to a dimension. The online system 140 applies a clustering algorithm to the vectors associated with each user of the third party system 130 to cluster 335 the users of the third party system 130 into various clusters. For example, a clustering algorithm generates clusters of users of the third party system 130 based on distances between vectors associated with various users of the third party system 130. In some embodiments, the online system 140 applies a k-means clustering algorithm to the vectors associated with various users of the third party system 130 to cluster 335 the users of the third party system 130. The online system 140 may generate a specified number of clusters (e.g., a number of clusters specified by information stored by the online system 140) or may generate a number of clusters until centroids of different clusters are separated by less than a threshold distance, where a centroid of a cluster is an average of an average of the vectors associated with users of the third party system 130 in the cluster. Hence, different clusters of users of the third party system 130 include users of the third party system 130 associated with vectors having small distances between them, indicating the users of the third party system 130 in a cluster who are connected to other users of the third party system 130 having similar distributions of the predicted characteristic (e.g., predicted ages.)

In some embodiments, the online system 140 identifies a set of users of the third party system 130 having a common characteristic and clusters 335 users of the third party system 130 within the set based on the vectors associated with the users of the third party system 130, as described above. For example, the online system 140 identifies a set of users of the third party system 130 having a common gender or a common location and clusters 335 users of the third party system 130 in the set into various clusters based on the distributions of ages of other users of the third party system 130 connected to the users of the third party system 130 in the set, as further described above. The online system 140 may identify various sets each including users of the third party system 130 having a different common characteristic and cluster 315 users of the third party system 130 in each set into clusters of users of the third party system 130 having a common characteristic corresponding to a set.

For each of the clusters, the online system 140 receives 340 information from a trusted additional third party system 130 describing a verified characteristic corresponding to the predicted characteristic (e.g., a verified age) of at least a subset of users of the third party system 130 in a cluster. A trusted additional third party system 130 maintains information associated with users having a higher likelihood of being accurate than information associated with users by the online system 140 or by the third party system 130. For example, a trusted additional third party system 130 includes information provided by users to multiple sources or includes information provided by a user to one or more particular organizations or entities (e.g., census information provided by users). As another example, a trusted additional third party system 130 obtains information from a panel of users for whom the third party system 130 has verified characteristics. Hence, the verified characteristic corresponding to the predicted characteristic received 340 from the trusted additional third party system 130 are more likely to accurately identify the actual characteristic (e.g., an actual age) of the users of the third party system 130. In various embodiments, the online system 140 maintains a cluster identifier associated with each cluster, with a cluster identifier uniquely identifying a cluster. To receive 340 information from the trusted additional third party system 130 describing the characteristic corresponding to the predicted characteristic (e.g., a verified age) of the subset of users of the third party system 130 in the cluster, the online system 140 retrieves information maintained by the online system 140 identifying one or more users of the third party system 130 in the cluster to the trusted additional third party system 130 and communicates the retrieved information identifying the users to the trusted additional third party system 130, which communicates verified characteristics corresponding to the predicted characteristic (e.g., verified ages) ages associated with users corresponding to the information identifying the one or more users in the cluster to the online system 140. In some embodiments, the online system 140 communicates the cluster identifier to the trusted additional third party system 130 along with the information identifying users of the third party system 130 in the cluster to the trusted additional third party system 130, and the trusted additional third party system 130 includes the cluster identifier in the information provided to the online system 140, allowing the online system 140 to more identify the cluster including the users of the third party system 130 identified to the trusted additional third party system 130.

In other embodiments, the online system 140 provides a cluster identifier to users of the third party system 130 in a cluster for storage by client devices 110 associated with the users of the third party system 130. A client device 110 may communicate the cluster identifier of a cluster and information stored on the client device 110 identifying a user of the third party system 130 in the cluster to the trusted third additional party system 130. For example, content presented by the client device 110 includes instructions that, when executed by the client device 110, communicate the cluster identifier and the information identifying the user of the third party system to the trusted additional third party system 130. The trusted additional third party system 130 retrieves a verified characteristic corresponding to the predicted characteristic (e.g., a verified age) age corresponding to the information identifying the user of the third party system 130 to the trusted additional third party system 130, and communicates the verified characteristic corresponding to the predicted characteristic (e.g., a verified age), as well as verified characteristics corresponding to the predicted characteristic (e.g., verified ages) of users of the third party system 130 in the cluster corresponding to other information received by the trusted additional third party system 130, to the online system 140. Hence, the additional trusted third party system 130 may communicate an aggregation of verified characteristics corresponding to the predicted characteristic (e.g., verified ages) of users of the third party system 130 included in a cluster corresponding to the cluster identifier to the online system 140. Providing the aggregation of verified characteristics corresponding to the predicted characteristic (e.g., verified ages) of users of the third party system 130 in a cluster prevents communication of information personally identifying various users of the third party system 130 between the online system 140 and the trusted additional third party system 130.

The online system 140 determines 345 an accuracy of the characteristic predicted for various users of the third party system 130 in a cluster based on the verified characteristics (e.g., verified ages) received from the trusted additional third party system 130 and the characteristic predicted for users of the third party system 130 in the cluster maintained by the online system 140. In some embodiments, the online system 140 determines 345 the accuracy of one or more characteristics predicted for users of the third party system 130 in a cluster as a percentage of the predicted characteristic (e.g., predicted ages) in the cluster matching a corresponding verified characteristic (e.g., a verified age) received from the trusted additional third party system 130. The online system 140 determines 345 the accuracy of the predicted characteristic (e.g., predicted ages) associated with users of the third party system 130 in the cluster as a percentage of users of the third party system 130 in the subset of the cluster having the predicted characteristic (e.g., a predicted age) matching a corresponding verified characteristic (e.g., a verified age) from the trusted additional third party system 130. The online system 140 stores the determined accuracy in association with the cluster. Accuracies for each cluster are determined 345 and stored in association with the clusters by the online system 140, allowing the online system 140 to maintain a measure of the accuracies of a characteristic (or characteristics) predicted for users of the third party system 130 in various clusters.

When selecting content for presentation to a viewing user of the third party system 130, the online system 140 may account for the characteristic predicted for the viewing user of the third party system 130 and an accuracy of the characteristic predicted for the viewing user of the third party system 130 by the online system 140. For example, the online system 140 allows users or other third party systems 130 to include accuracies of characteristics (e.g., predicted characteristics) associated with users as targeting criteria for content items in addition to the characteristics. As an example, targeting criteria included in a content item identifies an age range and a threshold accuracy of an age associated with the viewing user, so the content item is eligible for presentation to the viewing user of the third party system 130 if the age predicted for the viewing user of the third party system 130 by the online system 140 is within the age range in the targeting criteria and the age predicted for the viewing user of the third party system 130 by the online system 140 has at least the threshold accuracy.

In various embodiments, the online system 140 receives 350 a request to present a content item to a viewing user of the third party system 130 based at least in part on an age of the viewing user of the third party system 130. For example, targeting criteria associated with the content item specifies an age range and a threshold accuracy of an asserted age associated with the viewing user. When the online system 140 identifies an opportunity to present content to the viewing user, the online system 140 determines whether the content item is eligible for presentation to the viewing user by identifying 355 a cluster including the viewing user and determines an accuracy associated with the cluster, which represents an accuracy of age predicted for the viewing user of the third party system 130 by the online system 140. In response to the accuracy of the cluster including the viewing user of the third party system 130 equaling or exceeding the threshold accuracy included in the targeting criteria, the online system 140 includes 360 the content item in one or more selection processes for presentation to the viewing user of the third party system 130 if characteristics of the viewing user of the third party system 130 satisfy at least a threshold number of targeting criteria associated with the content item. For example, the content item is associated with targeting criteria specifying an age range and a threshold accuracy of an age, so the online system 140 includes 360 the content item in one or more selection processes selecting content for presentation to the viewing user if the accuracy associated with an identified cluster including the viewing user of the third party system 130 equals or exceeds the threshold accuracy of the age and the age predicted for the viewing user of the third party system 130 by the online system 140 is within the age range specified by the targeting criteria.

Alternatively, the online system 140 maintains a minimum accuracy of one or more characteristics predicted for the viewing user of the third party system 130. Hence, if an age predicted for the viewing user of the third party system 130 satisfies one or more targeting criteria associated with a content item, the online system 140 identifies 355 a cluster including the viewing user of the third party system 130 and compares the accuracy associated with the identified cluster to the minimum accuracy. If the accuracy associated with the identified cluster is less than the minimum accuracy, the online system 140 determines the age predicted for the viewing user of the third party system 130 does not satisfy the one or more targeting criteria associated with the content item, which may make the content item ineligible for presentation to the user. However, if the accuracy associated with the identified cluster equals or exceeds the minimum accuracy, the online system 140 continues determining that the age predicted for the viewing user of the third party system 130 satisfies the one or more targeting criteria associated with the content item.

Additionally, the online system 140 uses the accuracies associated with various identified clusters to modify the one or more models generated 320 by the online system 140 to determine 325 the predicted characteristic for users of the third party system 130. In some embodiments, the online system 140 determines a number or a percentage of clusters associated with at least a threshold accuracy, and modifies the one or more models if the determined number or percentage of clusters is less than a threshold value. Alternatively, the online system 140 determines an average accuracy associated with the clusters and modifies the one or more models if the average accuracy associated with the clusters is less than a threshold value. In other embodiments, the online system 140 selects one or more clusters and modifies the one or more models if the accuracy associated with the selected one or more clusters is less than a threshold value; this may allow the online system 140 to modify a model to improve the accuracy with which the model predicts characteristics in certain ranges (e.g., with which a model predicts a range of ages).

The online system 140 may predict various characteristics for users of the third party system 130 that have at least a threshold likelihood of being related to an additional characteristic and determine accuracy of the predicted characteristic based on verified characteristics maintained by a trusted additional third party system 130 as further described in conjunction with FIG. 3. For example, for a predicted characteristic related to an additional characteristic maintained by the online system 140 for users, the online system 140 clusters users of the third party system 130 based on the additional characteristic, as described above conjunction with FIG. 3 (i.e., the additional characteristic in the example of FIG. 3 is the distribution of ages of other users connected to the user). As an example, the online system 140 generates a vector for various users of the third party system 130, with one or more dimensions of the vector based on values of the additional characteristic. For each cluster, the online system 140 retrieves the verified characteristic for a subset of users of the third party system 130 in a cluster. By comparing the predicted characteristic of each user of the third party system 130 in the subset of users of the third party system 130 in the cluster to a verified characteristic of the user of the third party system 130 corresponding to the predicted characteristic retrieved from the trusted additional third party system 130, the online system 140 determines an accuracy of the predicted characteristic of users of the third party system 130 in the cluster, as described above in conjunction with FIG. 3. The online system 140 stores the determined accuracy in association with the cluster and similarly determines accuracies associated for each cluster. The determined accuracies may be used along with the predicted characteristic when selecting content for presentation to users, as described above in conjunction with FIG. 3.

Figure 4:
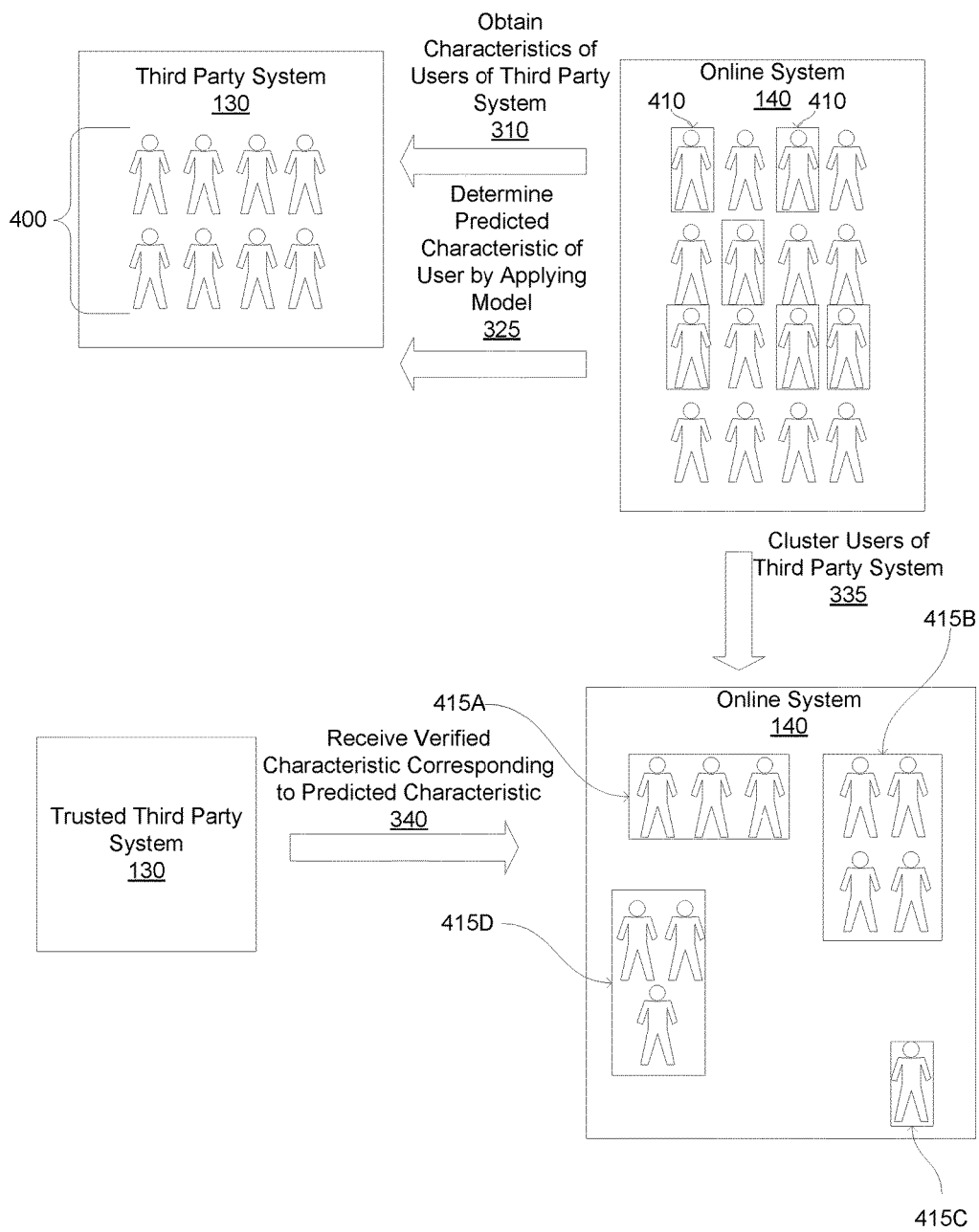
FIG. 4 is a process flow diagram of a method for determining an accuracy of an age predicted for a user of a third party system communicating with an online system by the online system, in accordance with an embodiment.

FIG. 4 is a process flow diagram of method for determining an accuracy of a characteristic predicted by an online system 140 for a user of a third party system 130 communicating with the online system 140. As further described above in conjunction with FIG. 3, the online system 140 obtains 310 characteristics of users 400 of the third party system 130 that are maintained by the third party system 130. The obtained characteristics do not include a characteristic used by the online system 140 to select content for presentation to users 400 of the third party system 130, which may impair selection of content by the online system 140. To improve selection of content for presentation to users 400 of the third party system 130, the online system 140 identifies a set 410 of users of the online system 140 so the characteristics of users in the set 410 match, or have at least a threshold similarity to characteristics of the users 400 of the third party system 130. In the example of FIG. 4, users surrounded by a rectangle are included in the set 410 identified by the online system 140, while users who are not surrounded by a rectangle are not included in the set 410.

The online system 140 maintains the characteristic that the third party system 130 does not maintain for its users 400, so the online system 140 generates a model that predicts the characteristic for users 400 of the third party system 130 based on values of the characteristic maintained by the online system 140 for users in the set 410 and other characteristics maintained by the online system 140 for users in the set 410. Hence, the model predicts the characteristic for a user 400 based on other characteristics of the user 400 (e.g., other characteristics associated with the characteristic). The online system 140 applies 325 the generated model to characteristics maintained by the third party system 130 for various users 400 to predict the characteristic for various users 400 of the third party system.

To account for potential inaccuracies in predicting the characteristic, for each of at least a group of users 400 of the third party system 130, the online system 140 determines a distribution of the predicted characteristic for other users 400 of the third party system 130 who are connected to a user of the third party system 130 via the third party system 130, as further described above in conjunction with FIG. 3. From the distributions determined for various users 400 of the third party system 130, the online system 140 clusters 335 users 400 of the third party system 130. Different clusters of users 400 of the third party system 130 include users 400 of the third party system 130 are connected to other users 400 of the third party system 130 having similar distributions of the predicted characteristic. For purposes of illustration, FIG. 4 shows cluster 415A, cluster 415B, cluster 415C, and cluster 415D of users 400 of the third party system 130. Users 400 of the third party system 130 included in cluster 415A are connected to other users 400 of the third party system 130 having similar distributions of the predicted characteristic to each other, while users 400 of the third party system 130 included in cluster 415C are connected to other users 400 of the third party system 130 having similar distributions of the predicted characteristic to each other.

For each of the clusters 415A, 415B, 415C, 415D, the online system 140 receives 340 information from a trusted third party system 130 describing a verified characteristic corresponding to the predicted characteristic of at least a subset of users 400 of the third party system 130 in a cluster 415A, 415B, 415C, 415D. As further described above in conjunction with FIGS. 2 and 3, the trusted third party system 130 maintains information associated with users having a higher likelihood of being accurate than information associated with users by the online system 140 or by the third party system 130. Because the verified characteristic corresponding to the predicted characteristic received 340 from the trusted third party system 130 is more likely to accurately identify the actual characteristic of the users 400 of the third party system 130, the online system 140 may determine the accuracy of the predicted characteristic for various clusters 415A, 415B, 415C, 415C by comparing the predicted characteristic for users in a cluster 415A, 415B, 415C, 415C to the verified characteristic received from the trusted third party system 130 for users in the cluster 415A, 415B, 415C, 415C. As further described above in conjunction with FIG. 3, the online system 140 stores the determined accuracy in association with various clusters 415A, 415B, 415C, 415C, and may modify the generated model based on the determined accuracy associated with various clusters 415A, 415B, 415C, 415C or account for the accuracy of the predicted characteristic for users 400 in 415A, 415B, 415C, 415C when selecting content for users 400 of the third party system 130.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus.

Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    accessing stored information describing a plurality of users of an online system, the information including, for each user of the online system, an asserted age of the user of the online system and a set of other users of the plurality of users of the online system with whom the user of the online system has established a connection in the online system;
    obtaining characteristics of users of a third party system that communicates with the online system, the third party system not maintaining stored information including asserted ages of users of the third party system;
    identifying a set of users of the online system wherein characteristics of the set of users have at least a threshold similarity to the obtained characteristics of users of the third party system;
    generating a model to determine a predicted age of users of the third party system based on characteristics of users of the set of users of the online system and asserted ages of users of the set of users of the online system;
    determining predicted ages of users of the third party system by applying the generated model to characteristics of users of the third party system;
    for each user of at least a group of users of the third party system, determining a distribution of predicted ages of other users of the third party system having a connection to the user of the third party system via the third party system;
    clustering at least the group of users of the third party system into one of a plurality of clusters based on the determined distributions;
    for each of the plurality of clusters,
        receiving information from a trusted additional third party system describing a verified age of each of at least a subset of the users of the third party system in the cluster,
        determining an accuracy of the predicted ages of the subset of users of the third party system in the cluster by comparing the predicted ages to the verified ages of the subset of users of the third party system in the cluster, and
        storing the determined accuracy in association with the cluster;
    receiving a request to present a content item to a viewing user of the third party system based at least in part on an age of a viewing user;
    identifying the cluster to which the viewing user of the third party system belongs; and
    including the content item in one or more selection processes selecting content for presentation to the viewing user of the third party system based at least in part on a predicted age of the viewing user of the third party system and the accuracy of the cluster including the viewing user of the third party system.

2. The method of claim 1, wherein the request to present the content item to the viewing user of the third party system includes a threshold accuracy of the predicted age of the viewing user of the third party system.

3. The method of claim 2, wherein including the content item in one or more selection processes selecting content for presentation to the viewing user of the third party system based at least in part on the predicted age of the viewing user of the third party system and the accuracy of the cluster to which the viewing user of the third party system belongs comprises:
    including the content item in the one or more selection processes in response to determining the accuracy of the cluster to which the viewing user of the third party system belongs equals or exceeds the threshold accuracy and the predicted age of the viewing user of the third party system satisfies an age included in the request.

4. The method of claim 3, wherein the predicted age of the viewing user of the third party system satisfies the age included in the request in response to the predicted age of the viewing user of the third party system being within an age range included in the request.

5. The method of claim 1, wherein including the content item in one or more selection processes selecting content for presentation to the viewing user of the third party system based at least in part on the predicted age of the viewing user of the third party system and the accuracy of the cluster to which the viewing user belongs comprises:
    including the content item in the one or more selection processes in response to determining the accuracy of the cluster to which the viewing user of the third party system belongs equals or exceeds a minimum accuracy specified by the online system and the predicted age of the viewing user of the third party system satisfies the age included in the request.

6. The method of claim 1, wherein clustering at least the group of users of the third party system into one of a plurality of clusters based on the determined distributions comprises:
    creating a vector for each of at least the group of users of the third party system, where each dimension in the vector for the user of the third party system indicates a number of the other users of the third party system connected to the user of the third party system having a predicted age within an age range; and
    clustering at least the group of users of the third party system into one of the plurality of clusters based on distances between the vectors.

7. The method of claim 1, wherein another user of the third party system having a connection to the user of the third party system via the third party system comprises an additional user of the third party system having a unilateral connection to the user of the third party system via the third party system and to whom the user has a unilateral connection via the third party system.

8. The method of claim 1, wherein another user of the third party system having a connection to the user of the third party system via the third party system comprises an additional user of the third party system having a bilateral connection to the user of the third party system via the third party system.

9. The method of claim 1, wherein clustering at least the group of users of the third party system into one of a plurality of clusters based on the determined distributions comprises:
creating a vector for each of at least the group of users of the third party system, where each dimension in the vector for the user of the third party system indicates a percentage of the other users of the third party system connected to the user of the third party system having an age within an age range; and
clustering at least the group of users of the third party system into one of the plurality of clusters based on distances between the vectors.

10. The method of claim 1, wherein determining the accuracy of the predicted ages of the subset of users of the third party system in the cluster by comparing the predicted ages to the verified ages of the subset of users of the third party system in the cluster comprises:
determining a percentage of users in the subset of users having predicted ages matching verified ages.

11. The method of claim 1, wherein receiving information from the trusted additional third party system describing a verified age of each of at least a subset of the users of the third party system in the cluster comprises:
communicating information identifying one or more users of the third party system in the cluster to the trusted additional third party system along with a cluster identifier corresponding to the cluster; and
receiving verified ages maintained by the trusted additional third party system for users of the third party system corresponding to the communicated information in association with the cluster identifier from the trusted additional third party system.

12. The method of claim 1, further comprising:
modifying the generated model based on the determined accuracies associated with one or more of the clusters.

13. A method comprising:
accessing stored information describing a plurality of users of an online system, the information including, for each user of the online system, an asserted characteristic of the user of the online system and a set of other users of the plurality of users of the online system with whom the user of the online system has established a connection in the online system;
obtaining characteristics of users of a third party system that communicates with the online system, the third party system not maintaining a characteristic of users of the third party system corresponding to the asserted characteristic maintained by the online system;
identifying a set of users of the online system wherein characteristics of the set of users have at least a threshold similarity to the obtained characteristics of users of the third party system;
generating a model to determine a predicted characteristic of users of the third party system based on characteristics of users of the set of users of the online system and the asserted characteristic included the stored information describing the plurality of users of an online system, wherein the predicted characteristic of users of the third party system is different from the obtained characteristics of the users of the third party system;
determining the predicted characteristic of users of the third party system by applying the generated model to characteristics of users of the third party system;
for each user of at least a group of users of the third party system, determining a distribution of an additional characteristic associated with the user of the third party system;
clustering at least the group of users of the third party system into one of a plurality of clusters based on the determined distributions;
for each of the plurality of clusters,
receiving information from a trusted additional third party system describing a verified characteristic of each of at least a subset of the users of the third party system of the cluster,
determining an accuracy of the predicted characteristic of the subset of users of the third party system of the cluster by comparing the predicted characteristic of various users of the third party system in the subset to the verified characteristic of various users of the third party system in the subset of users, and
storing the determined accuracy in association with the cluster;
receiving a request to present a content item to a viewing user of the third party system based at least in part on a value of the predicted characteristic of the viewing user of the third party system;
identifying the cluster to which the viewing user of the third party system belongs; and
including the content item in one or more selection processes selecting content for presentation to the viewing user of the third party system based at least in part on the predicted characteristic of the viewing user and the accuracy of the cluster to which the viewing user of the third party system belongs.

14. The method of claim 13, wherein the request to present the content item to the viewing user of the third party system includes a threshold accuracy of the value of the predicted characteristic of the viewing user of the third party system.

15. The method of claim 14, wherein including the content item in one or more selection processes selecting content for presentation to the viewing user of the third party system based at least in part on the predicted characteristic of the viewing user and the accuracy of the cluster to which the viewing user of the third party system belongs comprises:
including the content item in the one or more selection processes in response to determining the accuracy of the cluster to which the viewing user of the third party system belongs equals or exceeds the threshold accuracy and the predicted characteristic of the viewing user of the third party system satisfies a value of the asserted characteristic included in the request.

16. The method of claim 13, wherein including the content item in one or more selection processes selecting content for presentation to the viewing user of the third party system based at least in part on the predicted characteristic of the viewing user and the accuracy of the cluster to which the viewing user of the third party system belongs comprises:
including the content item in the one or more selection processes in response to determining the accuracy of the cluster to which the viewing user of the third party system belongs equals or exceeds a minimum accuracy specified by the online system and the predicted characteristic of the viewing user of the third party system satisfies the value of the asserted characteristic included in the request.

17. The method of claim 13, wherein another user of the third party system having a connection to the user of the third party system via the third party system comprises an additional user of the third party system having a unilateral connection to the user of the third party system via the third party system and to whom the user has a unilateral connection via the third party system.

18. The method of claim 13, further comprising:
modifying the generated model based on the determined accuracies associated with one or more of the clusters.

19. A computer program product comprising a non-transitory computer readable storage medium having instructions encoded thereon that, when executed by a processor, cause the processor to:
access stored information describing a plurality of users of an online system, the information including, for each user of the online system, an asserted age of the user of the online system and a set of other users of the plurality of users of the online system with whom the user of the online system has established a connection in the online system;
obtain characteristics of users of a third party system that communicates with the online system, the third party system not maintaining stored information including asserted ages of users of the third party system;
identify a set of users of the online system so characteristics of the set of users have at least a threshold similarity to the obtained characteristics of users of the third party system;
generate a model to determine a predicted age of users of the third party system based on characteristics of users of the set of users of the online system and asserted ages of users of the set of users of the online system;
determine predicted ages of users of the third party system by applying the generated model to characteristics of users of the third party system;
for each user of at least a group of users of the third party system, determine a distribution of predicted ages of other users of the third party system having a connection to the user of the third party system via the third party system;
cluster at least the group of users of the third party system into one of a plurality of clusters based on the determined distributions;
for each of the plurality of clusters,
receive information from a trusted additional third party system describing a verified age of each of at least a subset of the users of the third party system in the cluster,
determine an accuracy of the predicted ages of the subset of users of the third party system in the cluster by comparing the predicted ages to the verified ages of the subset of users of the third party system in the cluster, and
store the determined accuracy in association with the cluster;
receive a request to present a content item to a viewing user of the third party system based at least in part on an age of a viewing user;
identify the cluster to which the viewing user of the third party system belongs; and
include the content item in one or more selection processes selecting content for presentation to the viewing user of the third party system based at least in part on a predicted age of the viewing user of the third party system and the accuracy of the cluster including the viewing user of the third party system.

20. The computer program product of claim 19, wherein the non-transitory computer readable storage medium further has instructions encoded thereon that, when executed by the processor, cause the processor to: modify the generated model based on the determined accuracies associated with one or more of the clusters.

* * * * *